Patented Aug. 12, 1952

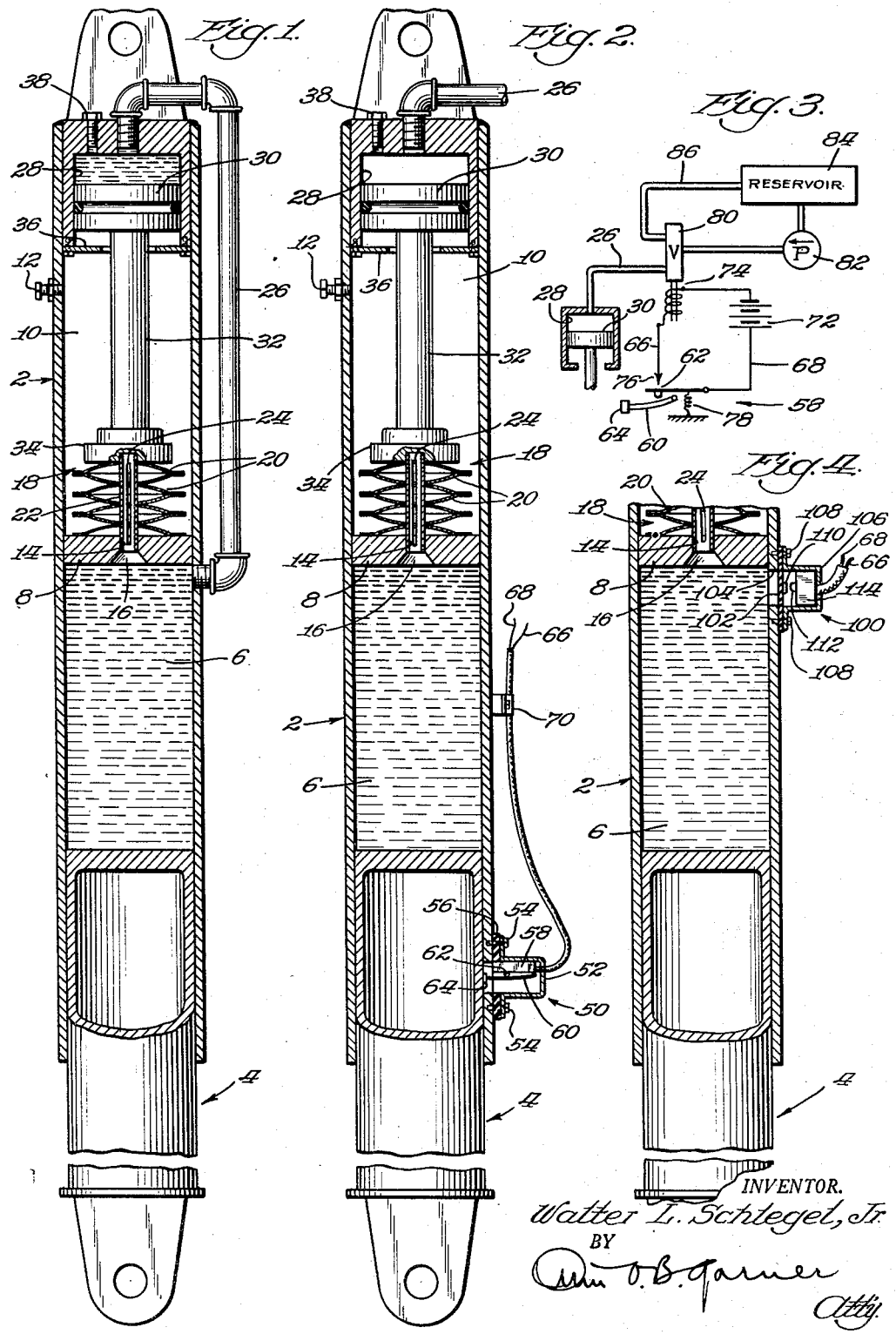

2,606,760

UNITED STATES PATENT OFFICE 2,606,760

SHOCK STRUT

Walter L. Schlegel, Jr., Chicago, Ill., assignor to American Steel Foundries, Chicago, Ill., a corporation of New Jersey Application October 11, 1947, Serial No. 779,371

6 Claims. (Cl. 267—64)

This invention relates to hydraulic shock absorbers and more particularly to a novel oleo shock strut, such as is frequently utilized in the landing gear of aircraft.

In a device of the above type, energy is absorbed by friction developed in a metering device which meters the flow of fluid on either the compression or extension stroke of the shock absorber depending upon its arrangement in the landing gear and in prior art arrangements the other stroke of the device upon release thereof is facilitated by unmetered flow of the hydraulic fluid through by-pass valve means.

A general object of the present invention is to eliminate the necessity for by-pass valve means in a shock absorber, such as above described, by providing means for automatically actuating the metering device on one stroke of the shock absorber and for automatically rendering the metering device inoperative on the other stroke of the shock absorber to accommodate substantially unmetered flow of hydraulic fluid through the metering device.

Another object of the invention is to provide, in combination with a novel compressible resilient metering unit, means for automatically compressing the unit on one stroke of the shock absorber to meter the flow of fluid through the unit and for releasing the unit on the other stroke of the shock absorber to accommodate unmetered flow of fluid therethrough.

Still another object of the invention is to design an arrangement, such as above described, wherein the resistance offered by the resilient unit to flow of fluid therethrough is directly proportional to the magnitude of the shock encountered by the absorber.

The foregoing and other objects and advantages of the invention will become apparent from a consideration of the following specification and the accompanying drawings, wherein:

Figure 1 is a central axial sectional view through a shock strut embodying the invention, portions of the device being shown in elevation to clarify the illustration;

Figure 2 is a view comparable to Figure 1 but illustrating a modification of the invention;

Figure 3 is a diagram illustrating a hydraulic system and associated electrical actuating system utilized with the embodiment of Figure 2; and Figure 4 is a fragmentary view corresponding to Figure 2 and illustrating a modification thereof.

Describing the invention in detail and referring first to the embodiment shown in Figure 1, the novel shock strut comprises a cylinder 2 and a piston 4 reciprocal therewithin and defining a high pressure chamber 6 at one side of a bulkhead 8 secured within the cylinder 2 in any convenient manner as by welding. At the opposite side of the bulkhead 8 is a low pressure chamber 10, the upper portion of which is provided with a gas spring in the form of a body of compressed pneumatic fluid admitted through a fitting 12, said spring being operable to actuate the piston 4 on the extension stroke thereof, as will be understood by those skilled in the art.

The bulkhead 8 comprises a port or passage 14 with a flared lower portion 16 accommodating flow of fluid from the high pressure chamber 6 to the low pressure chamber 10 on the compression stroke of the piston 4 as the same is urged into the cylinder 2.

On the compression stroke of the device flow of fluid through the passage 14 is metered by a resilient unit, generally designated 18, and more fully described in a copending Watts application, Serial No. 523,019, filed February 19, 1944, now Patent No. 2,471,294. The unit 18 comprises a plurality of reversely arranged, resilient, annular discs 20 sleeved over a tube 22 slidable within the passage 14 and slotted as at 24 to accommodate flow of fluid radially outwardly between the discs 20 and the low pressure chamber 10. It will be understood that the slotted tube 22 functions to position the discs 20 with their central openings in alignment so that during metering of the hydraulic fluid the same flows upwardly through the central openings in the disc and radially outwardly through the passages or interstices therebetween.

On the compression stroke of the device the high pressure fluid in the chamber 6 is also conveyed through a pipe 26 to a cylinder 28 mounted in the top of the strut cylinder 2 and containing a piston 30 connected by a rod 32 to the tube 22, the rod having an abutment 34 affording backing for the uppermost disc 20. Thus the high pressure fluid conveyed to the cylinder 28 urges the piston 30 downwardly under pressure substantially equal to that within the chamber 6. As the piston 30 is urged downwardly, the resilient discs 20 are compressed into a pile against the bulkhead 8 so that the hydraulic fluid flowing through the passage 14 between the discs 20 flexes the latter to define interstices therebetween and is thus metered while passing through said interstices into the low pressure chamber 10. Compression of the resilient unit 18 is limited by an annular stop ring 36 secured in any convenient manner to the lower end of the cylinder 28 and disengageable with the piston 30 to limit downward movement thereof in response to high pressure fluid within the cylinder 28.

In preparing the strut for use, the parts thereof are first assembled, as illustrated in Figure 1, and the cylinder 28 and the high pressure chamber 6 are filled with any suitable hydraulic fluid by removal of a plug 38 in the top of the cylinder 28. After the cylinder 28, the pipe 26 and the high pressure chamber 6 have been filled with the desired quantity of oil, the strut is permitted to assume its extended position, and the upper end of the cylinder 2 is filled with compressed gas through the fitting 12 to any desired pressure value depending upon the conditions to which the strut is to be subjected.

It will be understood that on the release stroke of the strut the pressure in the chamber 6 rapidly falls to a value below that in the chamber 10 whereupon the discs 20 are released to accommodate substantially unmetered flow of fluid from the chamber 10 to the chamber 6 until the unit 18 is again compressed by the development of high pressure in the chambers 6 and 28 on the compression stroke of the strut.

Referring now to Figure 2, a modification of the invention is illustrated wherein parts corresponding to those of Figure 1 are identified by corresponding numerals. In this embodiment of the invention actuation of the resilient metering unit 18 is accomplished by a motion responsive switch unit, generally designated 50, which is operatively connected to an hydraulic system associated with the pipe 26, as hereinafter described. The unit 50 comprises a casing 52 secured to the cylinder 2 adjacent its lower end as by screws 54, a resilient gasket 56 being interposed between the casing 52 and the cylinder 2 for a purpose hereinafter described. Secured within the casing 52 is a conventional snap action precision switch 58 operated in the usual manner by a spring bar 60 engageable with the movable contact 62 of the switch. The spring bar 60 carries a friction shoe 64 engaged with the piston 4, the shoe 64 being adjusted to tight frictional contact with the piston 4 by suitable compression of the gasket 56 as the screws 54 are adjusted. Thus on the compression stroke of the piston 4 the spring bar 60 is urged against the movable contact 62 to close an electrical circuit, as hereinafter described, and on the extension stroke of the piston 4 the spring bar 60 is urged out of engagement with the contact 62 thereby opening the circuit which is closed through leads 66 and 68 extending from the switch 58 and preferably secured to the cylinder 2 as by a clamp 70. The leads 66 and 68 and the pipe 26 extend upwardly from the cylinder 2 into the fuselage of the plane (not shown) for connection to an electrically operated hydraulic actuating system, shown in Figure 3.

In Figure 3 the switch 58, as diagrammatically illustrated, is connected to the leads 66 and 68, the lead 68 being connected to one terminal of a conventional voltage supply 72, the opposite terminal of which is connected to one end of a solenoid coil 74. The opposite end of the coil 74 is connected to the lead 66 which is connected to a fixed contact 76 of the switch 58. The switch is normally maintained in open position by a spring 78 connected to the movable contact 62.

Actuation of the movable contact 62 by the spring bar 60 closes a circuit through the solenoid 74 which closes a conventional operating valve 80, the inlet of which is connected to the discharge side of a pump 82. In its closed position the valve 80 directs flow of hydraulic fluid from the pump 82 to the line 26 and into the cylinder 28 to actuate the piston 30. The suction side of the pump 82 is connected to a reservoir 84 which is connected by a line 86 to the other outlet of the valve 80. When the spring bar 60 releases the movable contact 62 thereby breaking the circuit through the solenoid 74 to open the valve 80, the suction side of the pump 82, as well as the line 26, are connected to the reservoir 84 through the line 86 thereby reducing the pressure in the cylinder 28 to a negligible value accommodating release of the resilient actuating unit 18.

Thus it will be understood that Figure 2 illustrates an arrangement in which the resilient unit 18 is automatically actuated on the closure stroke of the strut and is automatically released or rendered inoperative on the extension stroke of the strut by the motion responsive switch unit 50 associated with the piston 4 and operatively connected to the actuating means for the metering unit 18.

Figure 4 illustrates a modification of the embodiment shown in Figures 2 and 3 wherein corresponding parts are identified by corresponding numerals. It will be understood that the arrangement of Figure 4 is identical with that of Figures 2 and 3 except that the switch unit, generally designated 100, is responsive to pressure within the high pressure chamber 6 of the strut. Thus on the compression stroke of the strut in response to high pressure within the chamber 6, the switch 100 is closed and on the extension stroke of the strut the switch is opened controlling actuation of the metering unit in the same manner as in the arrangement of Figures 2 and 3. The unit 100 comprises a flexible diaphragm 102 secured across a port or opening 104 in the cylinder 2 by a housing or casing 106 which is secured as by screws 108 to the cylinder. The diaphragm 102 carries a button 110 engageable with a movable contact 112 of a conventional snap action precision switch, generally designated 114.

Thus assuming, for example, that with the strut in its released position the pressure in the hydraulic fluid within the high pressure chamber 6 is one hundred pounds per square inch, a value developed by the gas spring in the upper end of the strut, the switch 114 may be adjusted to close at a value of one hundred and ten pounds per square inch. When the strut is subjected to a shock, initiating sudden compression of the strut, the diaphragm 102 actuating the movable contact 112 closes the switch 114 thereby actuating the resilient metering unit 18 to effect metering of the hydraulic fluid passing through the passage 14. Release of the piston 4 causes a rapid drop in the fluid pressure in chamber 6, to open the switch 114, thereby releasing the metering unit 18 and accommodating unmetered flow of fluid from the low pressure chamber 10 to the high pressure chamber 6.

It will be understood that I do not wish to be limied by the exact embodiments of the device shown which are merely by way of illustration and not limitation as various and other forms of the device will, of course, be apparent to those skilled in the art without departing from the spirit of the invention or the scope of the claims.

I claim:

1. A system of the class described comprising a shock absorber having a cylinder member adapted to contain hydraulic fluid, a piston member reciprocal in said cylinder member and defining therewith a high pressure chamber, another chamber in one of said members, said one member comprising a wall with a port affording the sole means for communication between said chambers, a resilient metering unit compressible axially of the shock absorber and comprising an axial passage communicating with said port, and a plurality of radial passages connected between said axial passage and said other pressure chamber, said radial passages being adapted to increase in axial breadth during expansion of said unit, and to decrease in axial breadth during compression of said unit, and a fluid pressure piston and cylinder device carried by said one member and operatively connected to the unit for compressing the latter against said wall, said system comprising means for delivering pressure fluid to said device for actuating the same, and control means for automatically rendering said delivering means ineffective on the extension stroke of said piston member.

2. A system according to claim 1, wherein the control means is responsive to pressure in the high pressure chamber.

3. A system according to claim 1, wherein the control means are responsive to movement of the piston member.

4. A system of the class decribed comprising a shock absorber having a cylinder member adapted to contain hydraulic fluid, a piston member reciprocal in said cylinder member, a low pressure chamber in one of the members, another pressure chamber defined by a wall of said one member and by a portion of the other member, a port through the wall connecting the chambers, a metering valve mechanism carried by said one member and adapted when actuated to meter flow of fluid through the port between said chambers, said mechanism being adapted when released to accommodate substantially unmetered flow of fluid through the port, a fluid pressure piston and cylinder device carried by said one member and operatively connected to said mechanism for actuation thereof, upon actuation of said device, said system comprising means externally of said chambers for delivering pressure fluid to said device for actuation thereof, valve means adapted in one position thereof to direct fluid from said delivering means to said device, said valve means being adapted in another position thereof to direct flow of fluid from said delivering means and said device to an associated reservoir, and means automatically operable on one stroke of the piston member for actuating the valve means to said one position thereof, and operable on the other stroke of the piston member for actuating the valve means to said other position thereof.

5. An hydraulic shock absorber comprising a cylinder adapted to contain hydraulic fluid, a piston reciprocal in said cylinder, a wall within the cylinder fixed with respect thereto and defining a pressure chamber with the piston, another pressure chamber in the cylinder at the side of said wall remote from the piston, a port through said wall, a metering valve mechanism carried by the cylinder and connected to said port, said valve mechanism being adapted when actuated to meter flow of fluid from the first-mentioned chamber to the second-mentioned chamber and being adapted when released to accommodate substantially unmetered flow of fluid from the second-mentioned chamber to the first-mentioned chamber, a power device carried by the cylinder and operatively connected to said mechanism for actuation thereof, a switch carried by the cylinder and engaged with the piston, said switch being closed by movement of the piston toward the wall and being opened by movement of the piston away from the wall, and means operatively connected to the switch and power device for actuating the latter when the switch is closed and for releasing the power device when the switch is opened.

6. An hydraulic shock absorber comprising a cylinder adapted to contain hydraulic fluid and having an internal wall fixed with respect thereto, pressure chambers in said cylinder at opposite sides of said wall interconnected by a port therethrough, a piston reciprocal in one chamber, a metering valve in the other chamber seated against said wall and adapted when actuated to meter flow of fluid through the port, a power device carried by the cylinder in said other chamber and operatively connected to the valve for actuation thereof, a switch carried by the cylinder and having an actuator engaged with the piston, said piston being adapted to move said actuater against the switch thereby closing the same when the piston moves toward said wall and being adapted to move the actuator away from the same thereby opening the same when the piston moves away from said wall, and means operated by the switch and operatively connected to the device for actuation thereof when the switch is closed, said means being inoperative when the switch is opened.

WALTER L. SCHLEGEL, Jr.

REFERENCES CITED

The following references are of record in the file of this patent:

UNITED STATES PATENTS

| Number | Name | Date |
|---|---|---|
| 2,186,011 | De Port | Jan. 9, 1940 |
| 2,196,089 | Wallace | Apr. 2, 1940 |
| 2,352,351 | Thornhill | June 27, 1944 |
| 2,471,294 | Watts | May 24, 1949 |